United States Patent [19]
Imasaka et al.

[11] Patent Number: 5,150,000
[45] Date of Patent: Sep. 22, 1992

[54] ULTRASONIC MOTOR

[75] Inventors: Yoshinobu Imasaka, Higashiosaka; Hiroshi Yoneno, Shiki; Masanori Sumihara, Moriguchi, all of Japan

[73] Assignee: Matsushita Electric Industrial Co., LTD, Osaka, Japan

[21] Appl. No.: 477,198

[22] Filed: Feb. 6, 1990

Related U.S. Application Data

[63] Continuation-in-part of Ser. No. 259,703, Oct. 19, 1988, abandoned.

[30] Foreign Application Priority Data

| Oct. 20, 1987 | [JP] | Japan | 62-262854 |
| Oct. 21, 1987 | [JP] | Japan | 62-266793 |
| Nov. 11, 1987 | [JP] | Japan | 62-284533 |
| Feb. 9, 1988 | [JP] | Japan | 62-27974 |
| Mar. 29, 1988 | [JP] | Japan | 63-75450 |
| Jun. 8, 1988 | [JP] | Japan | 63-141097 |

[51] Int. Cl.$^5$ .......................................... H01L 41/08
[52] U.S. Cl. ................................................... 310/323
[58] Field of Search ................................ 310/323, 328

[56] References Cited

U.S. PATENT DOCUMENTS

| 4,736,129 | 4/1988 | Endo et al. | 310/328 X |
| 4,739,212 | 4/1988 | Imasaka et al. | 310/328 X |
| 4,939,404 | 7/1990 | Inagaki et al. | 310/323 |

FOREIGN PATENT DOCUMENTS

| 0058887 | 3/1987 | Japan | 310/323 |
| 0257475 | 10/1988 | Japan | 310/323 |
| 0248975 | 10/1989 | Japan | 310/323 |
| 0017874 | 1/1990 | Japan | 310/323 |
| 0017875 | 1/1990 | Japan | 310/323 |
| 2217925 | 11/1989 | United Kingdom | 310/323 |

*Primary Examiner*—Mark O. Budd
*Attorney, Agent, or Firm*—Wenderoth, Lind & Ponack

[57] ABSTRACT

Provided herein is an ultrasonic motor in which at least fluorocarbon polymer is present on the contact surface of at least either of the rotor of the stator. Since the fluorocarbon polymer provides a smooth contact surface, the ultrasonic motor generates no noise and produces a stable starting torque and holding torque. In addition, it has a long life with a minimum of wear.

6 Claims, 3 Drawing Sheets

FIG. 5

ULTRASONIC MOTOR

This application is a continuation-in-part of now abandoned application Ser. No. 07/259,703 filed on Oct. 19, 1988.

BACKGROUND OF THE INVENTION

The present invention relates to an ultrasonic motor which is so designed as to produce a driving force by the aid of traveling waves of ultrasonic frequency vibration generated by piezoelectric elements.

An ultrasonic motor driven by traveling waves, as disclosed in, for example, U.S. Pat. No. 4,562,373, is made up of a flat piezoelectric element, a flat stator to which is attached said piezoelectric element, a rotor which is in contact under pressure with said stator, and a friction material interposed between said stator and said rotor. To run the motor, an electric power of ultrasonic frequency is applied to the piezoelectric element, with the time difference and phase difference properly controlled. The applied electric power generates transverse traveling waves in synchronism with the ultrasonic vibration in the thickness direction of the piezoelectric element and stator. The wave crests of the traveling waves drive the rotor forward through the friction material.

Figure 5:
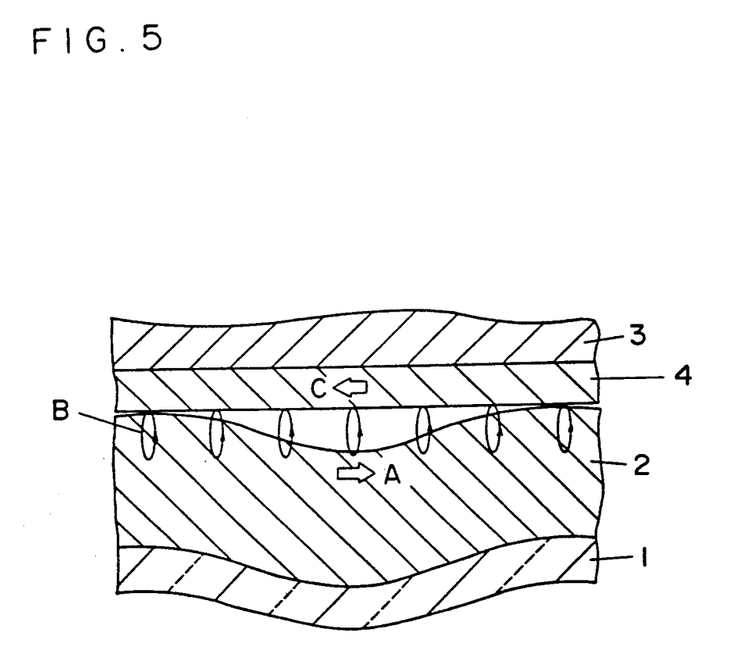
FIG. 5 is a schematic representation to explain the principle on which the ultrasonic motor works.

The ultrasonic motor of traveling wave type will be described with reference to FIG. 5. There are shown a piezoelectric element 1, a stator 2 which is bonded and fixed to the piezoelectric element 1, a rotor 3 placed on the stator 2, and a friction material 4 firmly attached to the rotor 3. When energized, the piezoelectric element 1 generates traveling waves of ultrasonic frequency which propagate in the direction of arrow A in the stator 2. The vibration causes each particle of the stator 2 to move along the elliptic orbit indicated by arrow B. The wave crest of the traveling wave advances horizontally in the direction opposite to that of the traveling wave, and the wave trough of the traveling wave advances horizontally in the same direction as the traveling wave. Therefore, the rotor 3 placed on the stator 2 is in contact with the wave crests only and is driven horizontally in the direction of arrow C by frictional force generated between the rotor 3 and the stator 2.

An important factor in the ultrasonic motor of such structure is how the rotor is in contact under pressure with the stator. It greatly affects the starting torque, no-load speed, motor efficiency, and motor life. Heretofore, much has been studied on increasing friction between the rotor and the stator. To this end, a variety of materials have been investigated. For example, there was proposed a method of increasing friction by attaching a metallic material or rubber having a high coefficient of friction to the rotor and bringing the rotor into contact with the stator under pressure. However, attaching a metallic material to the rotor needs precision working for the contact surfaces of the metallic material and the stator. An additional disadvantage is that the metal-to-metal contact produces a noise which is a problem in practical use.

A friction material other than metallic ones is a rubber slider which has a high coefficient of friction. The commercial one, however, has a disadvantage. That is, it is liable to wear as the contact surface is rubbed. The wearing adversely affects the starting torque, no-load speed, and motor efficiency, and eventually shortens the motor life. In addition, the rubber slider does not keep the holding torque (or braking torque) constant. (Holding torque is a force to hold the rotor in position when the motor is at rest.)

SUMMARY OF THE INVENTION

The present invention was completed to solve the above-mentioned problems involved in the prior art. Accordingly, it is an object of the present invention to provide an ultrasonic motor which meets the following requirements for practical use. (1) The noise level is as low as possible when the motor is running. (2) The drive force (torque) produced by contact under pressure should be as great as possible. (3) The wear of the contact surface should be as small as possible so that the motor keeps its performance over a long period of time. (4) The holding torque to keep the rotor in position when the motor is at rest should be constant.

The gist of the present invention resides in an ultrasonic motor having a platy stator provided with a platy piezoelectric element and a rotor which is in contact under pressure with said stator such that said rotor is driven through a friction means attached thereto by the wave crests of the transverse traveling wave of ultrasonic frequency which is generated on the surface of the stator in the thickness direction of said piezoelectric element and said stator when an electric power of ultrasonic frequency is applied to said piezoelectric element, characterized in that at least a fluorocarbon polymer is present on the contact surface of at least either said rotor or said stator.

While the novel features of the invention are set forth in the appended claims, the invention, both as to organization and content, will be better understood and appreciated, along with other objects and features thereof, from the following detailed description taken in conjunction with the drawings.

DETAILED DESCRIPTION OF THE INVENTION

Figure 1:
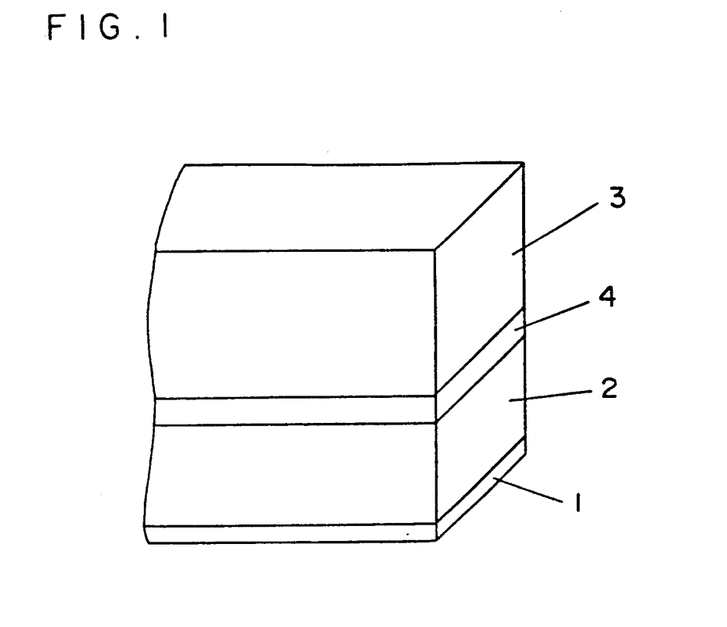
FIG. 1 is a perspective view showing the basic structure of an ultrasonic motor.

The ultrasonic motor of the present invention has the basic structure as shown in FIG. 1. It is made up of a platy piezoelectric element 1, a platy stator 2 to which is attached said piezoelectric element 1, a rotor 3 which is in contact under pressure with said stator 2, and at least a fluorocarbon polymer on the contact surface of at least either said stator 2 or said rotor 3.

Figure 2:
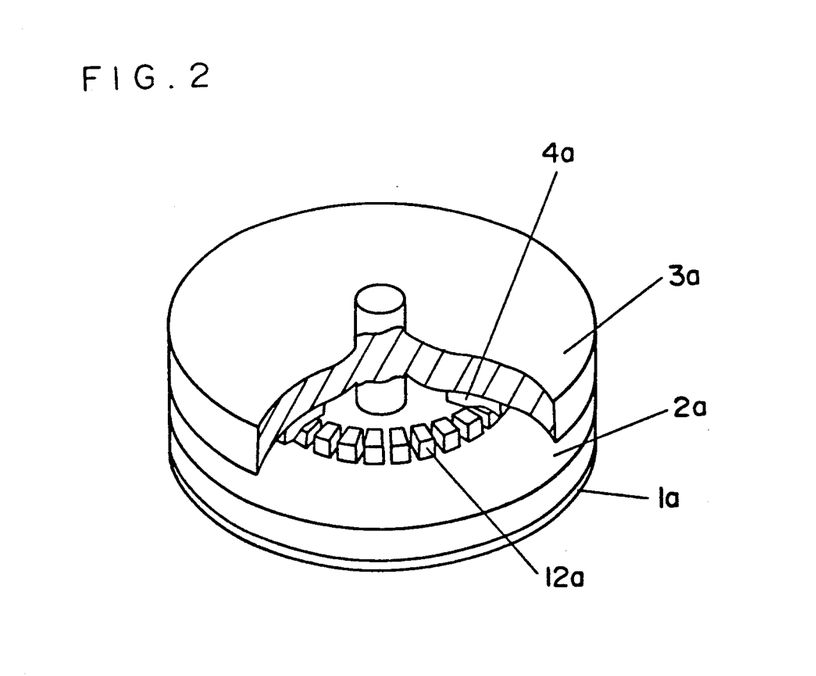
FIG. 2 is a perspective view showing the structure of a discoid ultrasonic motor.

The stator in contact with the rotor is usually made of a metallic material such as steel and stainless steel which has a low damping factor for vibration. Ultrasonic motors embodied according to the present invention include discoid one and toroidal one as shown in FIGS. 1 and 2, respectively.

The embodiments of the present invention are described in the following in which the friction material is at least a fluorocarbon polymer.

(a) EMBODIMENT IS WHICH THE FRICTION MATERIAL IS A plastic material containing fluorocarbon resin powder

Example 1

The friction material 4a shown in FIG. 2 was prepared in the following manner. At first, 5 parts by weight of polytetrafluoroethylene powder (having an average particle diameter of 10 μm) was mixed with 5 parts by weight (as solids) of resin BT-2121, which is a bismaleimide-triazine resin containing 30 wt % of flexibilizer, to effect uniform dispersion. The resulting mixture was molded into a 0.2 mm thick sheet by compression molding at 200° C. under 100 kg/cm$^2$ for 2 hours. (The polytetrafluoroethylene powder should preferably be of lubricant grade having an average particle diameter smaller than 20 μm.)

The thus obtained friction material 4a was bonded to the rotor 3a, and the contact surface of the friction material was polished. The resulting rotor assembly was mated with the stator. Thus there was obtained a discoid ultrasonic motor, 40 mm in diameter, as shown in FIG. 2. The rotor was pressed against the stator under a pressure of 4 kg/cm$^2$ applied by a spring. The ultrasonic motor produced a starting torque of 800 gf·cm and a no-load speed of 1100 rpm with an input power of about 8 W.

To see how the ultrasonic motor changes with time in performance, it was turned one million times continuously at 500 rpm under a load of 300 gf·cm. During this test run, the ultrasonic motor remained almost unchanged in performance (such as speed, torque, and efficiency). After the test run, no change was noticed on the contact surface of the stator. The wear of the contact surface of the plastics friction material measured after the test run was 10 μm. This wear is much smaller than that in the case of metal-to-metal friction. The ultrasonic motor in this example did not produce noise at all.

For the purpose of comparison, the same ultrasonic motor as mentioned above was prepared, except that the friction material was made of a resin. The motor was run under the same conditions as mentioned above to see how it changes with time in performance. The motor gradually decreased in speed and came to a halt after about 20,000 turns. Presumably, this happened because there is nothing to lubricate the stator and rotor.

Example 2

The friction material 4a as shown in FIG. 2 was prepared in the following manner. At first, 4 parts by weight of polytetrafluoroethylene powder (having an average particle diameter of 5 μm) was mixed with 5 parts by weight of phenolic resin and 1 part by weight of aromatic polyamide fiber cut to 2 mm (in the form of pulp) using an intensive mixer for 1 hour at room temperature. This mixing causes the polytetrafluoroethylene powder and aromatic polyamide fiber to uniformly disperse into the matrix resin. The resulting mixture was molded into a 0.2 mm thick sheet by compression molding at 150° C. under 100 kg/cm$^2$ for 2 hours. Also, different kinds of friction materials were prepared in the same manner as mentioned above, except that the aromatic polyamide fiber was replaced by other fibers. The thus obtained sheet-like friction materials were evaluated in the same manner as in Example 1. The results are shown in Table 1.

TABLE 1

| Plastics components | | | Motor performance | | |
| --- | --- | --- | --- | --- | --- |
| Kind of fiber | wt % | Polytetra-fluoroeth-ylene (wt %) | Starting torque (gf · cm) | No-load speed (rpm) | Wear (μm) |
| Aromatic polyamide fiber | 10 | 40 | 650 | 1100 | 8 |
| Carbon fiber | 10 | 40 | 700 | 1150 | 7 |
| Glass fiber | 15 | 35 | 650 | 1100 | 9 |
| Silicon carbide fiber | 5 | 45 | 650 | 1250 | 12 |
| Alumina fiber | 5 | 45 | 700 | 1300 | 14 |
| Quartz fiber | 5 | 45 | 650 | 1250 | 12 |
| Asbestos | 15 | 35 | 700 | 1100 | 11 |

Although thermosetting polyimide resin and phenolic resin were used as the matrix resin in the above-mentioned Examples 1 and 2, it is also possible to use other thermosetting resins and thermoplastic resins. In addition, it is also possible to control the friction performance by incorporating the plastics matrix with iron powder, copper powder, zinc powder, tin powder, stainless steel powder, powder of alloy of said metals, graphite powder, aluminum powder, molybdenum sulfide powder, mica powder, silicon carbide powder, or fluorocarbon powder.

EMBODIMENT IN WHICH THE FRICTION MATERIAL IS COMPOSED OF A MATRIX RESIN AND AT LEAST FLUOROCARBON RESIN POWDER AND CARBON FIBER

Example 3

Five kinds of friction materials (A to E) in the for of 1 mm thick sheet were prepared by combining 4 kinds of matrix resins, 5 kinds of fluorocarbon resin powders, and 6 kinds of carbon fibers as shown in Table 2. For comparison, two kinds of friction materials (F and G) containing no fluorocarbon resin powder were prepared. The thus prepared friction material was bonded to a stainless steel disc, 40 mm in diameter and 1 mm thick, to make a test piece.

The test piece was tested for dynamic friction which was produced when the test piece was turned at 30 rpm, with a stainless steel ball, 3 mm in diameter, in contact under a load of 200 g with the test piece at the position 15 mm apart from the center. The dynamic friction which changed with time was recorded. The results are shown in Table 3.

TABLE 2

| Desig-nation | Carbon fiber | wt % | Fluorocarbon resin powder | wt % | Matrix resin | wt % |
| --- | --- | --- | --- | --- | --- | --- |
| A | PAN-based short fiber | 20 | Tetrafluoro-ethylene polymer, 4 μm in dia. | 15 | Polyi-mide | 65 |
| B | PAN-based pulp-like fiber | 10 | Tetrafluoro-ethylene polymer, 2 μm in dia. | 25 | Polyi-mide | 65 |
| C | Pitch-based short fiber | 30 | Fluororubber | 10 | Polyi-mide (BT resin) | 60 |
| D | Pitch-based pulp-like | 20 | Tetrafluoro-ethylene | 15 | Phenolic resin | 65 |

TABLE 2-continued

| Designation | Carbon fiber | wt % | Fluorocarbon resin powder | wt % | Matrix resin | wt % |
|---|---|---|---|---|---|---|
| E | Phenolic-based short fiber | 15 | Hexafluoropropylene polymer | 15 | Rubber-modified phenolic resin | 70 |
| F* | PAN-based short fiber | 20 | — | — | Polyimide | 80 |
| G* | Pulp-like asbestos fiber | 30 | — | — | Phenolic resin | 70 |

*Comparative Examples

TABLE 3

Coefficient of Dynamic Friction

| Time | Designation of Friction Materials | | | | | | |
|---|---|---|---|---|---|---|---|
|  | A | B | C | D | E | F | G |
| Initial | 0.23 | 0.21 | 0.29 | 0.23 | 0.24 | 0.28 | 0.33 |
| After 10 min. | 0.24 | 0.22 | 0.30 | 0.25 | 0.25 | 0.37 | 0.44 |
| After 20 min. | 0.25 | 0.22 | 0.31 | 0.25 | 0.26 | 0.44 | 0.54 |
| After 30 min. | 0.25 | 0.22 | 0.31 | 0.25 | 0.26 | 0.49 | 0.61 |
| After 60 min. | 0.25 | 0.22 | 0.31 | 0.25 | 0.26 | 0.51 | 0.66 |
| After 90 min. | 0.25 | 0.22 | 0.31 | 0.25 | 0.26 | 0.51 | 0.68 |
| After 120 min. | 0.25 | 0.25 | 0.31 | 0.25 | 0.26 | 0.51 | 0.68 |

It is noted from Tables 2 and 3 that the composite friction materials composed of a matrix resin, fluorocarbon resin powder, and carbon fiber have a high coefficient of friction (higher than 0.2) which changed very little with time. By contrast, the friction materials (F and G in Comparative Examples) which contain no fluorocarbon resin powder greatly changed with time in coefficient of friction.

Example 4

Seven discoid ultrasonic motors as shown in FIG. 2 were prepared in which the friction material 4a is one of those which are designated as A to G in Example 3. The ultrasonic motor is made up of a piezoelectric element 1a, a stator 2a of stainless steel which is bonded to the surface of the piezoelectric element 1a, a rotor 4 of stainless steel, and a friction material 4a attached to the rotor 3a. The friction material 4a is made of the composite plastic sheet prepared in Example 3. The rotor 3a is pressed against the stator 2a by means of a spring so that an initial braking torque of 500 gf·cm is produced. The piezoelectric element is provided with four electrodes which are arranged so that four traveling waves are generated in the circumferential direction of the stator. The rotor 3a was driven at a no-load speed of 500 rpm by applying an electric field of resonance frequency, about 70 kHz. After running for a prescribed period of time, the motors were tested for restarting performance, braking torque (which is produced after de-energizing), and resonance frequency. The results are shown in Table 4.

TABLE 4

| Items | Designation of Friction Materials | | | | | | |
|---|---|---|---|---|---|---|---|
|  | A | B | C | D | E | F | G |
| Braking torque (gf · cm) | | | | | | | |
| Initial | 500 | 500 | 500 | 500 | 500 | 500 | 500 |
| After 1 hour | 510 | 510 | 520 | 510 | 520 | 1000 | 900 |
| After 2 hours | 510 | 510 | 530 | 520 | 530 | 1400 | 1300 |
| After 3 hours | 510 | 500 | 530 | 520 | 530 | 1400 | 1600 |
| After 5 hours | 510 | 500 | 530 | 520 | 530 | 1400 | 1600 |
| Restarting performance | | | | | | | |
| Initial | Good | Good | Good | Good | Good | Good | Good |
| After 5 hours | Good | Good | Good | Good | Good | Poor | Poor |
| Resonance frequency (kHz) | | | | | | | |
| Initial | 71.0 | 71.2 | 72.0 | 71.5 | 72.5 | 72.0 | 73.0 |
| After 5 hours | 71.3 | 71.3 | 72.5 | 71.9 | 72.9 | 74.0 | 75.5 |
| Wear of stator surface After 5 hours | Small | Small | Small | Small | Small | Great | Great |
| Wear of friction material After 5 hours | Small | Small | Small | Small | Small | Small | Great |
| Squeak during running | None | None | None | None | None | Yes | Yes |

It is noted from Table 4 that the ultrasonic motors equipped with one of the friction material A to E, which are composed of a matrix resin, fluorocarbon resin powder, and carbon fiber, changed with time very little in braking torque and resonance frequency. It is also noted that they had no problem with restarting and the stator 2a of stainless steel wore very little. By contrast, the ultrasonic motors equipped with one of the friction materials F and G, which do not contain fluorocarbon resin powder, greatly changed with time in braking torque and resonance frequency. In addition, they had a problem with restarting.

Example 5

Five kinds of composite plastics friction materials (designated as I to M) were prepared from polyimide (as a matrix resin), tetrafluoroethylene resin powder having an average particle diameter of 3 μm (as a fluorocarbon resin powder), and PAN-based pulp-like carbon fiber according to the formulation shown in Table 5. Each friction material was formed into a 1-mm thick sheet. This sheet was attached to the same discoid ultrasonic motors as used in Example 2. The ultrasonic motors were driven by applying an electric field of resonance frequency in the same manner as in Example 2. After running for a prescribed period of time, the motors were tested for restarting performance, braking torque (which is produced after de-energizing), and resonance frequency. The results are shown in Table 5.

TABLE 5

| Items | Designation of Friction Materials | | | | |
|---|---|---|---|---|---|
|  | I | J | K | L | M |
| PAN-based pulp-like carbon fiber (wt %) | 5 | 10 | 10 | 5 | 30 |
| Tetrafluoroethylene resin powder (wt %) | — | 2 | 5 | 5 | 20 |
| Polyimide (wt %) | 95 | 88 | 85 | 90 | 50 |

TABLE 5-continued

| Items | Designation of Friction Materials | | | | |
|---|---|---|---|---|---|
| | I | J | K | L | M |
| Braking torque (gf · cm) | | | | | |
| Initial | 500 | 500 | 500 | 500 | 500 |
| After 1 hour | 1000 | 900 | 550 | 530 | 510 |
| After 2 hours | 1300 | 1000 | 560 | 540 | 520 |
| After 3 hours | 1300 | 1000 | 560 | 540 | 520 |
| After 5 hours | 1300 | 1000 | 560 | 540 | 520 |
| Restarting performance | | | | | |
| Initial | Good | Good | Good | Good | Good |
| After 5 hours | Poor | Poor | Good | Good | Good |
| Resonance frequency (kHz) | | | | | |
| Initial | 70.2 | 71.6 | 71.4 | 71.3 | 71.3 |
| After 5 hours | 74.3 | 73.3 | 71.7 | 71.7 | 71.4 |
| Wear of stator surface After 5 hours | Great | Great | Small | Small | Small |
| Wear of friction material After 5 hours | Medium | Small | Small | Small | Small |
| Squeak during driving | Yes | Yes | None | None | None |

It is noted from Table 5 that the ultrasonic motors provided with one of the friction materials K, L, and M containing 5 wt % or more of fluorocarbon resin powder and 5 wt % or more of carbon fiber changed with time very little in braking torque and resonance frequency and had no problem with restarting. By contrast, the ultrasonic motors provided with one of the friction materials I and J containing 2 wt % or less of fluorocarbon resin powder greatly changed with time in braking torque and resonance frequency and were poor in restarting performance.

Example 6

A composite plastic friction material was prepared by impregnating felt with a phenolic resin solution in which are uniformly dispersed carbon fiber and fluorocarbon resin powder. After preliminary drying, the friction material was compression molded into a 1-mm thick sheet. This sheet was used as the friction material 4a in the discoid ultrasonic motor as shown in FIG. 2.

Example 7

A composite plastic friction material was prepared by impregnating laminated plain weaves of carbon fiber with a polyimide resin solution in which are uniformly dispersed fluorocarbon resin fine powder having an average particle diameter of 1 μm. After preliminary drying, the friction material was compression molded into a 1-mm thick sheet. This sheet was used as the friction material 4a in the discoid ultrasonic motor as shown in FIG. 2.

The ultrasonic motors in both Examples 6 and 7 had an initial braking torque of 500 gf·cm, which slightly changed to 530 gf·cm after running for 5 hours. They had resonance frequencies of 70.8 kHz and 70.6 kHz, respectively, which remained almost unchanged even after running for 5 hours. They had no problem with restarting. The friction material did not wear nor scratch the stator 2a of stainless steel with which it is in contact.

EMBODIMENT IN WHICH THE FRICTION MATERIAL IS COMPOSED OF A MATRIX RESIN AND AT LEAST FLUOROCARBON RESIN POWDER AND ORGANIC FIBER

The matrix resin that can be used in this embodiment includes, for example, polyimide, polyamideimide, epoxy resin, phenolic resin, silicone resin, polyester resin, polyarylate resin, and liquid-crystal polymer. The organic fiber that can be used in this embodiment includes, for example, aromatic polyamide fiber, phenolic fiber, organic polymer whisker, polybenzimidazole fiber, supermolecular-weight polyethylene fiber, and liquid-crystal plastic fiber. The amount of the organic fiber and fluorocarbon resin powder should be 5 wt % or more each. The friction material used in this embodiment may be further incorporated with an inorganic or metallic filler.

Example 8

Five kinds of friction materials (A1 to E1) in the form of 1 mm thick sheet were prepared from a composite material composed of a matrix resin and fluorocarbon resin powder and organic fiber as shown in Table 6. For comparison, two kinds of friction materials (F1 and G1) containing no fluorocarbon resin powder were prepared as shown in Table 6. The thus prepared friction material was bonded to a stainless steel disc, 40 mm in diameter and 1 mm thick, to make a test piece.

The test piece was tested for dynamic friction which was produced when the test piece was turned at 30 rpm, with a stainless steel ball (3 mm in diameter) in contact under a load of 200 g with the test piece at the position 15 mm apart from the center. The dynamic friction which changed with time was recorded. The results are shown in Table 7.

TABLE 6

| Designation | Organic fiber | wt % | Fluorocarbon resin powder | wt % | Matrix resin | wt % |
|---|---|---|---|---|---|---|
| A1 | Pulp-like aromatic polyamide "Kevlar" | 10 | Tetrafluoroethylene polymer | 25 | Polyimide | 65 |
| B1 | Pulp-like aromatic polyamide "Cornex" | 15 | Tetrafluoroethylene polymer | 20 | Phenolic resin | 65 |
| C1 | Phenolic polymer short fiber | 20 | Hexafluoropropylene polymer | 20 | Polyimide "BT resin" | 60 |
| D1 | Aromatic polyamide short fiber "HM-50" | 20 | Fluororubber | 25 | Polyamide-imide | 55 |
| E1 | Polyoxymethylene whisker | 15 | Tetrafluoroethylene polymer | 20 | Liquid crystal polyester | 65 |
| F1* | Pulp-like aromatic polyamide "Kevlar" | 15 | — | — | Polyimide | 85 |
| G1* | Pulp-like asbestos | 30 | — | — | Phenolic resin | 70 |

*Comparative Examples

TABLE 7

| | Coefficient of Dynamic Friction | | | | | | |
|---|---|---|---|---|---|---|---|
| | Designation of Friction Materials | | | | | | |
| Time | A1 | B1 | C1 | D1 | E1 | F1 | G1 |
| Initial | 0.23 | 0.21 | 0.26 | 0.28 | 0.25 | 0.29 | 0.33 |
| After 10 min. | 0.25 | 0.23 | 0.28 | 0.30 | 0.26 | 0.38 | 0.44 |
| After 20 min. | 0.25 | 0.23 | 0.29 | 0.31 | 0.26 | 0.45 | 0.54 |
| After 30 min. | 0.25 | 0.23 | 0.29 | 0.32 | 0.26 | 0.51 | 0.61 |
| After 60 min. | 0.25 | 0.23 | 0.29 | 0.32 | 0.26 | 0.53 | 0.66 |
| After 90 min. | 0.25 | 0.23 | 0.29 | 0.32 | 0.26 | 0.53 | 0.68 |

TABLE 7-continued

| | Coefficient of Dynamic Friction | | | | | | |
|---|---|---|---|---|---|---|---|
| | Designation of Friction Materials | | | | | | |
| Time | A1 | B1 | C1 | D1 | E1 | F1 | G1 |
| After 120 min. | 0.25 | 0.23 | 0.29 | 0.32 | 0.26 | 0.53 | 0.68 |

It is noted from Tables 6 and 7 that the composite friction materials composed of a matrix resin, fluorocarbon resin powder, and organic fiber have a high coefficient of friction (higher than 0.2) which changed with time very little. By contrast, the friction materials (F1 and G1 in Comparative Examples) which contain no fluorocarbon resin powder greatly changed with time in coefficient of friction.

Example 9

Seven discoid ultrasonic motors as shown in FIG. 2 were prepared in which the friction material 4a is one of those which are designated as A1 to G1 in Example 8. The ultrasonic motor is made up of a piezoelectric element 1a, a stator 2a of stainless steel which is bonded to the surface of the piezoelectric element 1a, a rotor 4a of stainless steel, and a friction material 4a attached to the rotor 3a. The friction material 4a is made of the composite plastic sheet prepared in Example 8. The rotor 3a is pressed against the stator 2a by means of a spring so that an initial braking torque of 500 gf·cm is produced. The piezoelectric element is provided with four electrodes which are arranged so that four traveling waves are generated in the circumferential direction of the stator. The rotor 3a was driven at a no-load speed of 500 rpm by applying an electric field of resonance frequency, about 70 kHz. After running for a prescribed period of time, the motors were tested for restarting performance, braking torque, and resonance frequency. The results are shown in Table 8.

TABLE 8

| | Designation of Friction Materials | | | | | | |
|---|---|---|---|---|---|---|---|
| Items | A1 | B1 | C1 | D1 | E1 | F1 | G1 |
| Braking torque (gf · cm) | | | | | | | |
| Initial | 500 | 500 | 500 | 500 | 500 | 500 | 500 |
| After 1 hour | 520 | 510 | 520 | 520 | 500 | 1100 | 900 |
| After 2 hours | 520 | 520 | 520 | 530 | 510 | 1500 | 1300 |
| After 3 hours | 520 | 520 | 520 | 540 | 510 | 1500 | 1600 |
| After 5 hours | 520 | 520 | 520 | 540 | 510 | 1500 | 1600 |
| Restarting performance | | | | | | | |
| Initial | Good | Good | Good | Good | Good | Good | Good |
| After 5 hours | Good | Good | Good | Good | Good | Poor | Poor |
| Resonance frequency (kHz) | | | | | | | |
| Initial | 71.5 | 71.5 | 71.3 | 71.8 | 71.3 | 72.5 | 73.0 |
| After 5 hours | 71.9 | 71.8 | 71.6 | 72.6 | 71.5 | 74.5 | 75.5 |
| Wear of stator surface After 5 hours | Small | Small | Small | Small | Small | Great | Great |
| Wear of friction material After 5 hours | Small | Small | Small | Small | Small | Small | Great |
| Squeak during driving | None | None | None | None | None | Yes | Yes |

It is noted from Table 8 that the ultrasonic motors equipped with one of the friction materials A1 to E1, which are composed of a matrix resin, fluorocarbon resin powder, and organic fiber, changed with time very little in braking torque and resonance frequency. It is also noted that they had no problem with restarting and the stator 2a of stainless steel wore very little. By contrast, the ultrasonic motors equipped with one of the friction material F1 and G1, which do not contain fluorocarbon resin powder, greatly changed with time in braking torque and resonance frequency. In addition, they had problems with restarting.

Example 10

Five kinds of composite plastics friction materials (designated as I1 to M1) were prepared from polyimide, fluorocarbon resin powder, and organic fiber according to the formulation shown in Table 9. Each friction material was formed into a 1-mm thick sheet. This sheet was attached to the same discoid ultrasonic motors as used in Example 9. The ultrasonic motors were driven by applying an electric field of resonance frequency in the same manner as in Example 9. After running for a prescribed period of time, the motors were tested for restarting performance, braking torque, and resonance frequency. The results are shown in Table 9.

TABLE 9

| | Designation of Friction Materials | | | | |
|---|---|---|---|---|---|
| Items | I1 | J1 | K1 | L1 | M1 |
| Aromatic polyamide fiber (wt %) | 5 | 10 | 10 | 5 | 20 |
| Tetrafluoroethylene resin powder (wt %) | — | 2 | 5 | 5 | 20 |
| Polyimide (wt %) | 95 | 88 | 85 | 70 | 60 |
| Braking torque (gf · cm) | | | | | |
| Initial | 500 | 500 | 500 | 500 | 500 |
| After 1 hour | 1000 | 800 | 550 | 530 | 520 |
| After 2 hours | 1400 | 1000 | 560 | 540 | 520 |
| After 3 hours | 1400 | 1000 | 560 | 540 | 520 |
| After 5 hours | 1400 | 1000 | 560 | 540 | 520 |
| Restarting performance | | | | | |
| Initial | Good | Good | Good | Good | Good |
| After 5 hours | Poor | Poor | Good | Good | Good |
| Resonance frequency (kHz) | | | | | |
| Initial | 72.3 | 71.8 | 71.6 | 71.5 | 71.5 |
| After 5 hours | 74.5 | 73.6 | 72.0 | 71.9 | 71.7 |
| Wear of stator surface After 5 hours | Great | Great | Small | Small | Small |
| Wear of friction material After 5 hours | Medium | Small | Small | Small | Small |
| Squeak during running | Yes | Yes | None | None | None |

It is noted from Table 9 that the ultrasonic motors provided with one of the friction materials K1, L1, and M1 containing 5 wt % or more of fluorocarbon resin powder and 5 wt % or more of organic fiber changed with time very little in braking torque and resonance frequency and had no problems with restarting. By contrast, the ultrasonic motors provided with one of the friction materials I1 and J1 containing 2 wt % or less of fluorocarbon resin powder greatly changed with time in braking torque and resonance frequency and were poor in restarting performance.

(D) EMBODIMENT IN WHICH THE FRICTION IS MADE OF FLUOROCARBON RESIN CONTAINING AT LEAST CARBON FIBER OR CARBON POWDER

The carbon fiber that can be used in this embodiment is not specifically limited; it may be in the form of short fiber, long fiber, continuous filament, woven cloth, felt, or paper. The carbon powder that can be used in this embodiment is not specifically limited either. It may be in the form of graphite or carbon. In this embodiment, the following six friction materials, A2 to F2, were prepared for evaluation.

(1) Friction material A2

A woven cloth of carbon fiber [1] was impregnated with an aqueous dispersion of tetrafluoroethylene resin [2]. After drying, 10 sheets of the impregnated cloths placed on top of the other were sintered at 370° C. under a pressure of 300 kg/cm$^2$. The resulting molded sheet composed of 65% of carbon fiber and 35% of tetrafluoroethylene resin was ground to a thickness of 0.5 mm.
[1] "Besphite W1103", plain weave, basis weight 125 g/m$^2$, made by Toho Rayon Co., Ltd.
[2] "Polyflon TFE Dispersion D-1", made by Daikin Kogyo Co., Ltd.

(2) Friction material B2

A felt of carbon fiber was impregnated with an aqueous dispersion of tetrafluoroethylene resin [2]. After drying, 10 sheets of the impregnated felts placed on top of the other were sintered at 370° C. under a pressure of 300 kg/cm$^2$. The resulting molded sheet composed of 55% of carbon fiber and 45% of tetrafluoroethylene resin was ground to a thickness of 1 mm.
[1] "Carbon Felt 3A", 5 mm thick, made by Nippon Carbon Co., Ltd.
[2] "Polyflon TFE Dispersion D-1", made by Daikin Kogyo Co., Ltd.

(3) Friction material C2

Chopped carbon fiber [1] was mixed with tetrafluoroethylene resin powder [2] using a mixer. The mixture was sintered in a mold at 370° C. under a pressure of 400 kg/cm$^2$. The resulting molded article composed of 25% of carbon fiber and 75% of tetrafluoroethylene resin was ground to a thickness of 1 mm.
[1] "Carboron NF-C4", 4 mm long, made by Nippon Carbon Co., Ltd.
[2] "Polyflon Powder M-15", made by Daikin Kogyo Co., Ltd. (4) Friction material D2

Graphite powder [1] was mixed with tetrafluoroethylene resin powder [2] using a mixer. The mixture was sintered in a mold at 370° C. under a pressure of 400 kg/cm$^2$. The resulting molded article composed of 35% of graphite powder and 65% of tetrafluoroethylene resin was ground to a thickness of 2 mm.
[1] Carbon powder having an average particle diameter smaller than 1 μm, made by Tokai Carbon Co., Ltd.
[2] "Polyflon Powder M-15", made by Daikin Kogyo Co., Ltd. (5) Friction material E2

A woven cloth of carbon fiber [1] was impregnated with an aqueous dispersion of tetrafluoroethylene resin [2]. After drying, the impregnated cloth was rolled into a cylinder, followed by sintering at 380° C. in an autoclave under a pressure of 100 kg/cm$^2$. The resulting cylindrical molded article composed of 65% of carbon fiber and 35% of tetrafluoroethylene resin was cut in round slices, 3 mm thick.
[1] "Besphite W1103", plain weave, basis weight 125 g/m$^2$, made by Toho Rayon Co., Ltd.
[2] "Polyflon TFE Dispersion D-1", made by Daikin Kogyo Co., Ltd.

(6) Friction material F2

For the purpose of comparison, a 1 mm thick friction layer was made by grinding tetrafluoroethylene resin (formed by sintering under pressure "Polyflon M-15", made by Daikin Kogyo Co., Ltd.).

Six discoid ultrasonic motors were prepared in which the friction material is one of those (designated as A2 to F2) prepared as mentioned above. The piezoelectric element is provided with four electrodes which are arranged so that four traveling waves are generated in the circumferential direction of the stator. The rotor was driven by applying an electric power of 80 V at a resonance frequency of 70 Khz. After running for a prescribed period of time, the motors were tested for restarting performance, braking torque after de-energizing, wear of the stator surface, wear of the friction material, and squeaking during running. The results are shown in Table 10.

TABLE 10

| Items | Designation of Friction Materials | | | | | |
|---|---|---|---|---|---|---|
| | A2 | B2 | C2 | D2 | E2 | F2 |
| Holding torque (gf · cm) | | | | | | |
| Initial | 1500 | 1500 | 1500 | 1500 | 1500 | 300 |
| After 30 minutes | 1530 | 1540 | 1550 | 1560 | 1520 | 360 |
| After 1 hour | 1550 | 1570 | 1590 | 1600 | 1520 | 410 |
| After 2 hours | 1550 | 1570 | 1600 | 1610 | 1520 | 430 |
| After 24 hours | 1550 | 1570 | 1600 | 1610 | 1520 | 430 |
| Restarting performance | | | | | | |
| Initial | Good | Good | Good | Good | Good | Good |
| After 24 hours | Good | Good | Good | Good | Good | Poor |
| Squeaking during running | | | | | | |
| Initial | None | None | None | None | None | Yes |
| After 24 hours | None | None | None | None | None | Yes |
| Wear of stator surface After 24 hours | None | Small | Small | None | None | None |
| Wear of friction material After 24 hours | <1 μm | <1 μm | <1 μm | <1 μm | <1 μm | 70 μm |

It is noted from Table 10 that the ultrasonic motors equipped with one of the friction materials A2 to E2 changed with time very little in holding torque and had no problems with restarting and noise. It is also noted that the friction material and stator wore very little after continuous running for 24 house. By contrast, the ultrasonic motor equipped with the friction material F2, which is made of fluorocarbon resin alone, did not start when the screw was tightened so that an initial holding torque of 1500 gf·cm is produced. It started when the screw was loosened until the initial holding torque decreased 300 gf·cm. However, it did not restart smoothly after continuous running for 24 hours. Moreover, it generated noise during running. The friction material wore as much as 70 μm after continuous running for 24 hours. Incidentally, the low holding torque leads to the low starting torque.

Then, the following three friction materials G2, H2, and I2 were prepared, and their performance was evaluated in the same manner as mentioned above.

(7) Friction material G2

A felt of carbon fiber [1] was impregnated with an aqueous dispersion of trifluorochloroethylene resin [2]. After drying, the impregnated felt was sintered at 310° C. under a pressure of 300 kg/cm$^2$. The resulting molded sheet composed of 55% of carbon fiber and 45% of trifluorochloroethylene resin was ground to a thickness of 1 mm.
[1] "Carbon Felt 3A", 5 mm thick, made by Nippon Carbon Co., Ltd.
[2] "Daiflon CTFE Dispersion D-55", made by Daikin Kogyo Co., Ltd.

(8) Friction material H2

A woven cloth of carbon fiber [1] was impregnated with an aqueous dispersion of tetrafluoroethylene-hexafluoropropylene copolymer resin [2]. After drying, 10 sheets of the impregnated cloths placed on top of the other were sintered at 370° C. under a pressure of 300 kg/cm². The resulting molded sheet composed of 65% of carbon fiber and 35% of tetrafluoroethylene-hexafluoropropylene copolymer resin was ground to a thickness of 1 mm.
[1] "Besphite W1103", plain weave, basis weight 125 g/m², made by Toho Rayon Co., Ltd.
[2] "Neoflon FEP Dispersion ND-1", made by Daikin Kogyo Co., Ltd.

(9) Friction material I2

Tetrafluoroethylene resin powder [1] was mixed with 25% of graphite powder [2] and 15% of silicon carbide whisker powder [3] using a mixer. The mixture was sintered in a mold at 370° C. under a pressure of 400 kg/cm². The resulting molded article was ground to a thickness of 2 mm.
[1] "Polyflon M-15", made by Daikin Kogyo Co., Ltd.
[2] Carbon powder having an average particle diameter smaller than 1 μm, made by Tokai Carbon Co., Ltd.
[3] "SCW #1-50", 0.05-1.5 μm in diameter and 20-200 μm long, made by Tateho Kagaku Kogyo Co., Ltd.

Three discoid ultrasonic motors were prepared in which the friction material is one of those (designated as G2, H2, and I2) prepared as mentioned above. After running for a prescribed period of time, the motors were tested for restarting (which occurs when the power source is turned on and off intermittenlty), holding torque after de-energizing, wear of the stator surface, wear of the friction material, and squeaking during running. The results are shown in Table 11.

TABLE 11

| Items | Designation of Friction Materials | | |
|---|---|---|---|
| | G2 | H2 | I2 |
| Holding torque (gf · cm) | | | |
| Initial | 1500 | 1500 | 1500 |
| After 30 minutes | 1560 | 1550 | 1570 |
| After 1 hour | 1600 | 1590 | 1610 |
| After 2 hours | 1600 | 1590 | 1620 |
| After 24 hours | 1600 | 1590 | 1620 |
| Restarting performance | | | |
| Initial | Good | Good | Good |
| After 24 hours | Good | Good | Good |
| Squeaking during running | | | |
| Initial | None | None | None |
| After 24 hours | None | None | None |
| Wear of stator surface After 24 hours | Small | None | Small |
| Wear of friction material After 24 hours | <1 μm | <1 μm | <1 μm |

It is noted from Table 11 that the ultrasonic motors equipped with one of the friction materials G2, H2, and I2 changed with time very little in holding torque and had no problems with restarting and noise. It is also noted that the friction material and stator wore very little after continuous running for 24 hours.

The above-mentioned embodiments show that the friction material composed of fluorocarbon resin containing carbon fiber or carbon powder wears out very little and prevents the stator from wearing, and consequently the ultrasonic motor provided with it changes with time very little in holding torque, exhibits good restarting performance, and produces no noise.

Incidentally, in the above-mentioned embodiments, the fluorocarbon resin may be incorporated with other fibrous or powdery fillers in addition to the carbon fiber and carbon powder.

(E) EMBODIMENT IN WHICH THE FRICTION MATERIAL IS A MOLDED ARTICLE CONTAINING 50 TO 95 WT % OF FLUOROCARBON POLYMER

Example 11

A friction material was prepared by mixing (in dry process) 7 parts by weight of polytetrafluoroethylene powder (as fluorocarbon polymer) and 3 parts by weight of liquid-crystal all-aromatic polyester resin powder ("Econol", resistant to high temperatures above 400° C.). The powder mixture was compression-molded under 350 kg/cm², followed by sintering at 370° C., to give a 1.0 mm thick sheet. The sheet underwent surface treatment with a commercial surface treating agent for the improvement of adhesion.

The sheet of friction material was bonded to the rotor with a commercial adhesive (glass fiber-containing epoxy resin type). The surface of the bonded sheet was ground with a cemented carbide cutting tool for the improvement of surface precision and the removal of the surface treating agent.

The rotor was mated with a stator, 40 mm in outside diameter, made of stainless steel, under a pressure of 4 kg/cm² applied by a spring, so that the rotor has a holding torque of 1200 gf·cm (which is a force required to start the rotor). The resulting ultrasonic motor produced a starting torque of 1000 gf·cm and ran at a no-load speed off 1000 rpm when an input power of about 8 N was applied. To see how the ultrasonic motor changes with time in performance, it was turned two million times continuously at a speed of 500 rpm under a load of 500 gf·cm. The ultrasonic motor remained almost unchanged in speed, torque, efficiency, and holding torque. In addition, the stator surface in contact with the friction material remained unchanged. The contact surface of the friction material wore only 4 μm after continuous running for 200 hours. This amount of wear is by far smaller than that (100 μm or more) in the case of metal-to-metal friction under the same condition. The ultrasonic motor in this example did not produce noise at all unlike the one in which metals rub against each other.

For the purpose of comparison, the friction material was prepared from polytetrafluoroethylene alone. It was not of practical use because of its poor mechanical strength, low torque, and excessive wear. In other words, the effect of the present invention is produced only when the friction material is incorporated with 5 wt % or more of filler. On the other hand, the friction material cannot be made into a sufficiently strong sheet if it contains less than 50 wt % of polytetrafluoroethylene.

The above-mentioned result conflicts with that in the case of the conventional friction material made of rubber which provides a sufficient frictional force. In other words, it was found that despite its low coefficient of friction, polytetrafluoroethylene under pressure provides a certain amount of driving force (torque) proportional to the pressure. It was also found that the friction material made of polytetrafluoroethylene wears very little, maintains its performance over a long period of time, and provides a constant holding torque when the motor is at rest.

The sheet of the friction material should be thicker than 0.1 mm; otherwise, it absorbs vibrations very little and generates noise as in the case of metal-to-metal contact. With a thickness greater than 2.0 mm, it absorbs transverse traveling waves, decreasing the efficiency, on account of its flexibility.

Example 12

A friction material was prepared by mixing (in dry process) 7 parts by weight of polytetrafluoroethylene powder (as fluorocarbon polymer) and 3 parts by weight of milled glass fiber. The mixture was compression-molded under 800 kg/cm$^2$, followed by sintering at 370° C., to give a 0.5 mm thick sheet. The sheet underwent surface treatment with a commercial surface treating agent for the improvement of adhesion. The friction material was also incorporated, in addition to glass fiber, with a fibrous filler (such as aromatic polyamide fiber, carbon fiber, silicon carbide fiber, alumina fiber, quartz fiber, and asbestos fiber) or a powdery filler (such as graphite powder, fluorinated graphite powder, and molybdenum sulfide powder), for the purpose of mechanical reinforcement, wear reduction, and long-term stability. The ultrasonic motors provided with the friction material mentioned above gave good results.

Examples of the fluorocarbon polymer that can be used in the present invention include, in addition to polytetrafluoroethylene, tetrafluoroethylene-hexafluoropropylene copolymer, polychlorotrifluoroethylene, tetrafluoroethylene-perfluoroalkylvinylether copolymer, polyvinylidene fluoride, polyvinyl fluoride, ethylene-tetrafluoroethylene copolymer, and chlorotrifluoroethyleneethylene copolymer.

(F) EMBODIMENT IN WHICH THE FRICTION MATERIAL IS A MOLDED ARTICLE CONTAINING UNIFORMLY DISPERSED WHISKER-LIKE POWDER AS A FILLER

Figure 4:
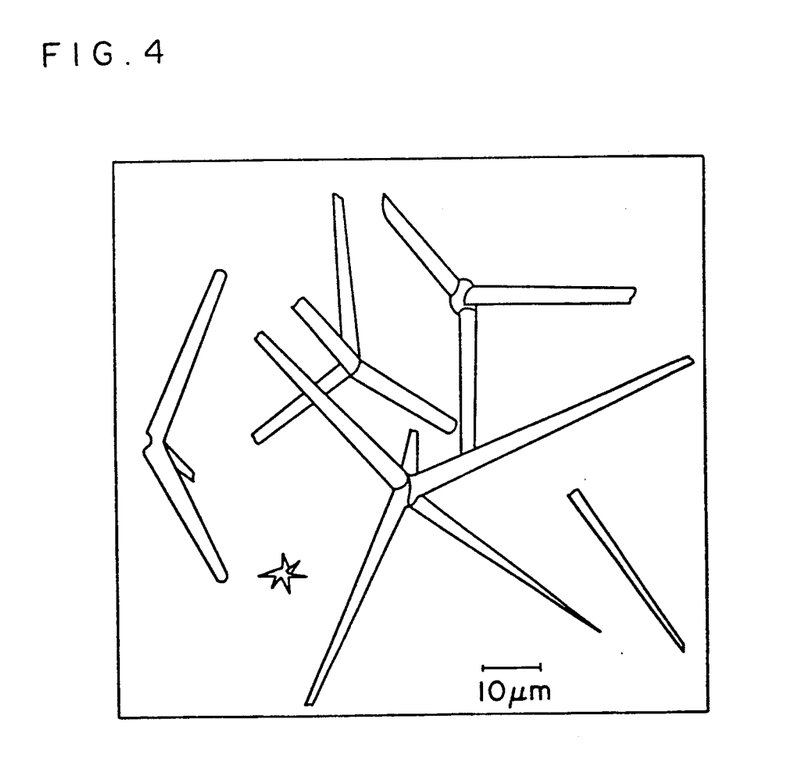
FIG. 4 is an enlarged view of powder particles having a plurality of whisker-like projections, said powder particles being an element constituting the present invention.

The whisker-like powder that can be used in this embodiment is not specifically limited; but it should preferably be a needle-like powder having a diameter smaller than 5 μm and an aspect ratio greater than 5, composed mainly of potassium titanate, silicon nitride, or silicon carbide. The amount of the whisker-like powder in the friction material should preferably be 2 to 100 parts by weight for 100 parts by weight of the fluorocarbon resin.

the whisker-like powder may be one which has three or more projections as shown in FIG. 4. The projections should preferably have a diameter greater than 10 μm and an aspect ratio greater than 2. The amount of such a powder in the friction material should preferably be 2 to 100 parts by weight for 100 parts by weight of the fluorocarbon resin.

The friction material filled with uniformly dispersed powder can be produced by uniformly mixing a fluorocarbon resin powder with a whisker-like powder or a powder having whisker-like projections, compression molding the mixture, and sintering the molded product at a melting point of the fluorocarbon resin.

The friction material can also be incorporated, in addition to the above-mentioned whisker-like powder or powder having whisker-like projections, with molybdenum sulfide powder, carbon fiber, carbon fluoride powder, inorganic powder, organic powder, or metallic powder.

In this embodiment, friction materials designated as A3 to I3 were prepared in the following manner.

Friction Material A3

90 parts by weight of tetrafluoroethylene resin powder [1] was uniformly mixed with 10 parts by weight of silicon carbide whisker powder [2]. The mixture was compression molded under 500 kg/cm$^2$, followed by sintering at 360° C. for 2 hours, to give a 1 mm thick molded product of fluorocarbon resin filled with uniformly dispersed whisker powder. The resulting molded product was ground to a thickness of 0.5 mm.
[1] "Polyflon M-12", made by Daikin Kogyo Co., Ltd.
[2] "SCW", 0.05–1.5 μm in diameter, 5–200 μm long, and aspect ratio 20–200; made by Tateho Kagaku Kogyo Co., Ltd.

Friction Material B3

85 parts by weight of tetrafluoroethylene resin powder [1] was uniformly mixed with 15 parts by weight of silicon nitride whisker powder [2]. The mixture was compression molded under 500 kg/cm$^2$, followed by sintering at 360° C. for 2 hours, to give a 2 mm thick molded product. The resulting molded product was ground to a thickness of 1 mm.
[1] "Polyflon M-21", made by Daikin Kogyo Co., Ltd.
[2] "SNW", 0.1–1.6 μm in diameter, 5–200 μm long, and aspect ratio 20–200; made by Tateho Kagaku Kogyo Co., Ltd.

Friction Material C3

70 parts by weight of tetrafluoroethylene-hexafluoropropylene copolymer resin powder [1] was uniformly mixed with 30 parts by weight of potassium titanate whisker powder [2]. The mixture was compression molded at 360° C. under a pressure of 200 kg/cm$^2$ to give a 1 mm thick molded product. The resulting molded product was ground to a thickness of 0.5 mm.
[1] "Neoflon FEP", made by Daikin Kogyo Co., Ltd.
[2] "LS-20", 0.3–0.7 μm in diameter and 5–30 μm long; made by Chitan Kogyo Co., Ltd.

Friction Material D3

80 parts by weight of tetrafluoroethylene resin powder [1] was uniformly mixed with 20 parts by weight of zinc oxide powder have 3 to 5 whisker-like projections [2]. The mixture was compression molded under 500 kg/cm$^2$, followed by sintering at 360° C. for 2 hours, to give a 1.5 mm thick molded product. The resulting molded product was ground to a thickness of 1 mm.
[1] "Polyflon M-12", made by Daikin Kogyo Co., Ltd.
[2] ZnO tetrapod-like whisker, 1–3 μm thick and 20–100 μm long; made by Matsushita Industrial Equipment Co., Ltd.

Friction Material E3

75 parts by weight of tetrafluoroethylene resin powder [1] was uniformly mixed with 20 parts by weight of zinc oxide powder having 3 to 5 whisker-like projections [2] and 5 parts by weight of molybdenum sulfide powder [3]. The mixture was compression molded under 500 kg/cm$^2$, followed by sintering at 360° C. for 2 hours, to give a 1.5 mm thick molded product. The resulting molded product was ground to a thickness of 1 mm.
[1] "Polyflon M-12", made by Daikin Kogyo Co., Ltd.
[2] ZnO tetrapod-like whisker, 1–3 μm thick and 20–100 μm long; made by Matsushita Industrial Equipment Co., Ltd.
[3] "M5 Powder", 0.5 μm in average particle diameter; made by Nippon Molybdenum Co., Ltd.

Friction Material F3

5 parts by weight of tetrafluoroethylene resin powder [1] was uniformly mixed with 10 parts by weight of silicon carbide whisker powder [2] and 3 parts by weight of carbon powder (having a particle diameter smaller than 1 μm). The mixture was compression molded under 500 kg/cm², followed by sintering at 360° C. for 2 hours, to give a 1.5 mm thick molded product. The resulting molded product was ground to a thickness of 1 mm.
[1] "Polyflon M-21", made by Daikin Kogyo Co., Ltd.
[2] "SCW", 0.05-1.5 μm in diameter, 5-200 μm long, and aspect ratio 20-200; made by Tateho Kagaku Kogyo Co., Ltd.

Friction Material G3

70 parts by weight of tetrafluoroethylene resin powder [1] was uniformly mixed with 25 parts by weight of potassium titanate whisker powder [2] and 5 parts by weight of fluorinated carbon powder [3]. The mixture was compression molded under 500 kg/cm², followed by sintering at 360° C. for 2 hours, to give a 1.5 mm thick molded product. The resulting molded product was ground to a thickness of 1 mm.
[1] "Neoflon FEP", made by Daikin Kogyo Co., Ltd.
[2] "LS-20", 0.3-0.7 μm in diameter and 5-30 μm long; made by Chitan Kogyo Co., Ltd.

Friction Material H3 (For Comparison)

A 1 mm thick friction material was made from fluorocarbon resin alone.

Friction Material I3 (For Comparison)

A 1 mm thick friction material was made from an engineering plastic composed of phenolic resin and asbestos fiber.

The compressive modulus and the coefficient of friction of the friction materials prepared as mentioned above were measured. The results are shown in Table 12. (The coefficient of friction was calculated from the friction resistance a pressing stylus (3 mm in diameter, made of stainless steel 303) produces when it is pressed under a load of 200 g against the surface of the friction material turning at 500 rpm, with the contact position being 10 mm away from the center.

Figure 3:
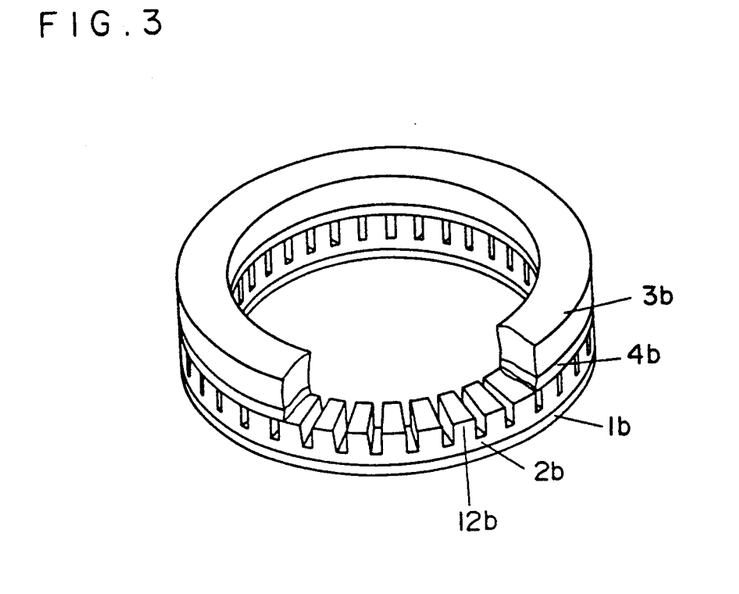
FIG. 3 is a perspective view showing the structure of a toroidal ultrasonic motor.

Each of the above mentioned friction materials A3 to I3 was used in the ultrasonic motor as shown in FIG. 3. The ultrasonic motor is provided with electrodes so that four traveling waves are generated in the circumferential direction of the disc. The rotor is pressed against the stator with a proper force which is established by measuring the braking torque.

The resonance frequency was measured which changes according as the braking torque changes in the range of 500 to 1500 gf·cm. The ultrasonic motor was run with a braking torque of 1000 gf·cm by the application of electric power at 80 V and a frequency close to the resonance frequency. The no-load speed and starting torque were measured. Also, after running for a prescribed period of time, the braking torque and the wear of the friction material were measured and the surface of the stator was examined for scratches. During running, the squeaking of the motor was checked. The results are shown in Table 12.

TABLE 12

| Items | Designation of Friction Materials | | | | | | | | |
|---|---|---|---|---|---|---|---|---|---|
| | A3 | B3 | C3 | D3 | E3 | F3 | G3 | H3 | I3 |
| Compressive modulus, kg/mm² | 110 | 120 | 150 | 180 | 190 | 120 | 150 | 40 | 700 |
| Coefficient of friction | 0.26 | 0.26 | 0.24 | 0.27 | 0.21 | 0.25 | 0.22 | 0.14 | 0.48 |
| Resonance frequency (kHz) at different braking torque | | | | | | | | | |
| at 500 gf · cm | 71.5 | 71.6 | 72.0 | 72.5 | 72.7 | 71.5 | 72.0 | 70.5 | 75.0 |
| at 1000 gf · cm | 72.0 | 72.2 | 72.8 | 73.6 | 73.8 | 72.1 | 72.8 | 70.8 | 78.5 |
| at 1500 gf · cm | 72.5 | 72.7 | 73.5 | 74.7 | 74.6 | 72.7 | 73.4 | 71.2 | 81.0 |
| Braking torque (gf · cm) | | | | | | | | | |
| Initial | 1000 | 1000 | 1000 | 1000 | 1000 | 1000 | 1000 | 300 | 1000 |
| After 30 minutes | 1010 | 1010 | 1020 | 1010 | 1010 | 1010 | 1010 | 360 | 1200 |
| After 1 hour | 1020 | 1020 | 1030 | 1020 | 1010 | 1010 | 1020 | 410 | 1550 |
| After 2 hours | 1030 | 1030 | 1040 | 1030 | 1010 | 1010 | 1020 | 430 | 1650 |
| After 24 hours | 1030 | 1030 | 1040 | 1030 | 1010 | 1010 | 1020 | 430 | 1650 |
| Starting torque, gf · cm | 610 | 610 | 550 | 620 | 500 | 570 | 530 | 230 | 800 |
| Speed of revolution, rpm | 730 | 740 | 750 | 770 | 780 | 740 | 750 | 700 | 680 |
| Restarting performance | | | | | | | | | |
| Initial | Good | Good | Good | Good | Good | Good | Good | Good | Poor |
| After 24 hours | Good | Good | Good | Good | Good | Good | Good | Poor | Poor |
| Squeak during running | | | | | | | | | |
| Initial | None | None | None | None | None | None | None | None | Yes |
| After 24 hours | None | None | None | None | None | None | None | Yes | Yes |
| Wear of stator surface After 48 hours | None | None | None | None | None | None | None | None | Great |
| Wear of friction material After 48 hours | 4 μm | 4 μm | 6 μm | 2 μm | <1 μm | 3 μm | 4 μm | 130 μm | 25 μm |
| Starting torque gf · cm After 24 hours | 600 | 610 | 520 | 620 | 500 | 560 | 520 | 150 | 300 |

It is noted from Table 12 that all the ultrasonic motors provided with one of the friction materials A3 to G3 pertaining to the present invention have a resonance frequency which fluctuates only a little (about 1 to 2 kHz) when the pressure is changed (in terms of braking torque in the range of 500 to 1500 gf·cm), and also have a braking torque which changes with time only a little. The friction materials pertaining to the present invention wear very little and scratch the stator very little. The ultrasonic motors maintained the stable performance over a long period of time, exhibited the stable restarting performance, and generated no noise. The starting torque (in the range of 530 to 620 gf·cm) remained almost unchanged after continuous running for 24 hours. In the above-mentioned experiments, the friction materials A3, B3, and C3 are made of a fluorocarbon resin filled with whisker-like powder; the friction material D3 is made of a fluorocarbon resin filled with powder having whisker-like projections; and the friction materials E3, F3, and G3 are made of fluorocarbon resin incorporated with molybdenum sulfide powder, carbon powder, or fluorinated carbon powder.

By contrast, the ultrasonic motor provided with the friction material H3 (for comparison) does not start when a pressure to produce a braking torque of 1000 gf·cm is applied. It starts when the pressure is reduced so that a braking torque of 300 gf·cm is applied; but the starting torque is only 230 gf·cm at that time. In addition, the friction material wore to a great extent and the ultrasonic motor did not restart smoothly after continuous running for 24 hours.

In the case of the ultrasonic motor provided with the friction material I3 (for comparison) made of an engineering plastic, the resonance frequency greatly fluctuated according as the pressure changed and the braking torque greatly changed with time. The restarting of the motor was unstable. The starting torque decreased to 40% initial value after continuous running for 24 hours. The motor generated noise.

(G) EMBODIMENT IN WHICH THE FRICTION MATERIAL IS A MOLDED ARTICLE CONTAINING A UNIFORMLY DISPERSED FILLER

The filler that can be used in this embodiment is a powder of organic polymeric material. The powder is not specifically limited, and it includes, for example, polyimide resin powder, aromatic polyamide resin powder, aromatic polyester resin powder, benzoguanamine resin powder, polyether ketone resin powder, phenolic resin powder, epoxy resin powder, and polyester sulfone resin powder. These resin powders may contain an inorganic filler. Incidentally, the friction material in this embodiment may contain, in addition to the organic polymeric material and fluorocarbon resin, other fibrous or powdery fillers. In this embodiment, friction materials designated as A4 to F4 were prepared in the following manner.

Friction Material A4

70 parts by weight of tetrafluoroethylene resin powder [1] was uniformly mixed with 30 parts by weight of aromatic polyester resin powder [2]. The mixture was compression molded under 500 kg/cm$^2$, followed by sintering at 360° C. for 2 hours, to give a 1 mm thick molded product. The resulting molded product was ground to a thickness of 0.5 mm.

[1] "Polyflon M-12", having an average particle diameter of 20 μm, made by Daikin Kogyo Co., Ltd.
[2] A powder (having an average particle diameter of 5 μm) of an organic polymeric material obtained by crushing "Econol" (having a softening point of 300° C.) made by Sumitomo Chemical Co., Ltd.

Friction Material B4

50 parts by weight of tetrafluoroethylene resin powder [1] was uniformly mixed with 50 parts by weight of polyimide resin powder [2]. The mixture was compression molded under 500 kg/cm$^2$, followed by sintering at 360° C. for 1 hour, to give a 2 mm thick molded product. The resulting molded product was ground to a thickness of 1.5 mm.

[1] "Polyflon M-12 ", made by Daikin Kogyo Co., Ltd.
[2] A powder (having an average particle diameter of 15 μm) of an organic polymeric material obtained by crushing "Vespel" (having a softening point of 300° C.) made by Du Pont.

Friction Material C4

100 parts by weight of aqueous dispersion of tetrafluoroethylene resin [1] was uniformly mixed with 40 parts by weight of aromatic polyamide resin powder [2].

The mixture was dried in a vacuum at 50° C. and the residual solids were crushed. The resulting powder was compression molded under 500 kg/cm$^2$, followed by sintering at 360° C. for 1 hour, to give a 1 mm thick molded product. The resulting molded product was ground to a thickness of 0.7 mm.

[1] "Polyflon D-1", containing 60 % of tetrafluoroethylene resin powder, made by Daikin Kogyo Co., Ltd.
[2] A powder (having an average particle diameter of 10 μm) of an organic polymeric material obtained by crushing aromatic polyamide resin (having a softening point of 300° C. or above) made by Teijin Limited.

Friction Material D4

75 parts by weight of tetrafluoroethylene resin powder [1] was uniformly mixed with 20 parts by weight of benzoguanamine resin powder [2] and 5 parts by weight of graphite powder [3]. The mixture was compression molded under 500 kg/cm$^2$, followed by sintering at 360° C. for 1 hour, to give a 1 mm thick molded product. The resulting molded product was ground to a thickness of 0.3 mm.

[1] "Polyflon M-12", made by Daikin Kogyo Co., Ltd.
[2] A powder (having an average particle diameter of 2 μm) of an organic polymeric material obtained by crushing hard benzoguanamine resin made by Nippon Shokubai Kagaku Kogyo Co., Ltd.
[3] Having an average particle diameter of 1 μm or below.

Friction Material E4 (for comparison)

A 1 mm thick friction material was made from fluorocarbon resin [1] alone by compression molding under 500 kg/cm$^2$, followed by sintering at 360° C. for 2 hours.

[1] "Polyflon M-12", made by Daikin Kogyo Co., Ltd.

Friction Material F4 (For Comparison)

A 1 mm thick friction material was made from a composite resin composed of polyamideimide resin and inorganic filler.

The compressive modulus and the coefficient of friction of the friction materials prepared as mentioned above were measured. The results are shown in Table 13. The coefficient of friction was calculated from the friction resistance a pressing stylus (3 mm in diameter, made of stainless steel 303) produces when it is pressed under a load of 200 g against the surface of the friction material turning at 500 rpm, with the contact position being 10 mm away from the center.

Each of the above mentioned friction materials A4 to E4 was used in the ultrasonic motor as shown in FIG. 2. The ultrasonic motor is provided with electrodes so that four traveling waves are generated in the circumferential direction of the disc. The rotor is pressed against the stator with a proper force which is established by measuring the braking torque.

The resonance frequency was measured which changes according as the braking torque changes in the range of 500 to 1500 gf·cm. The ultrasonic motor was run with a braking torque of 1000 gf·cm by the application of electric power at 80 V and a frequency close to the resonance frequency. The no-load speed and starting torque were measured. Also, after running for a prescribed period of time, the braking torque and the wear of the friction material were measure and the surface of the stator was examined for scratches. During running, the squeaking of the motor was checked. The results are shown in Table 13.

TABLE 13

| Items | Designation of Friction Materials | | | | | |
|---|---|---|---|---|---|---|
| | A4 | B4 | C4 | D4 | E4 | F4 |
| Compressive modulus, kg/mm$^2$ | 180 | 150 | 130 | 190 | 40 | 800 |
| Coefficient of friction | 0.31 | 0.27 | 0.27 | 0.25 | 0.14 | 0.45 |

TABLE 13-continued

| Items | Designation of Friction Materials | | | | | |
|---|---|---|---|---|---|---|
| | A4 | B4 | C4 | D4 | E4 | F4 |
| Resonance frequency (kHz) at different braking torgue | | | | | | |
| at 500 gf · cm | 72.5 | 72.0 | 71.8 | 72.8 | 70.5 | 75.0 |
| at 1000 gf · cm | 73.7 | 72.8 | 72.4 | 73.9 | 70.8 | 78.3 |
| at 1500 gf · cm | 74.8 | 73.5 | 72.9 | 74.8 | 71.2 | 81.5 |
| Braking torque (gf · cm) | | | | | | |
| Initial | 1000 | 1000 | 1000 | 1000 | 300 | 1000 |
| After 30 minutes | 1010 | 1020 | 1010 | 1030 | 360 | 1200 |
| After 1 hour | 1020 | 1030 | 1020 | 1050 | 410 | 1550 |
| After 2 hours | 1020 | 1030 | 1020 | 1050 | 430 | 1650 |
| After 24 hours | 1020 | 1030 | 1020 | 1050 | 430 | 1650 |
| Starting torque, gf · cm | 680 | 630 | 620 | 520 | 230 | 750 |
| Speed of revolution, rpm | 780 | 730 | 750 | 750 | 700 | 680 |
| Restarting performance | | | | | | |
| Initial | Good | Good | Good | Good | Good | Poor |
| After 24 hours | Good | Good | Good | Good | Poor | Poor |
| Squeak during running | | | | | | |
| Initial | None | None | None | None | None | Yes |
| After 24 hours | None | None | None | None | Yes | Yes |
| Wear of stator surface After 24 hours | None | None | None | None | None | Yes |
| Wear of friction material After 24 hours | 3 μm | 3 μm | 3 μm | 2 μm | 70 μm | 5 μm |

Table 13 shows the following. The friction materials A4 to D4, which are made of a fluorocarbon resin and a heat-resistant organic polymeric material, have a higher coefficient of friction and a greater compressive modulus (3 times or above) than the friction material (E4) made of a fluorocarbon resin alone, Therefore, the ultrasonic motors provided with one of the friction material A4 to D4 gave a starting torque of 520 to 680 gf·cm when the rotor is pressed against the stator with a force which generates a braking torque of 1000 gf·cm. By contract, the ultrasonic motor provided with the friction material E4 (for comparison) did not start when a pressure to produce a braking torque of 100 gf·cm was applied. It started when the pressure was reduced so that a braking torque of 300 gf·cm was applied; but the starting torque was only about 230 gf·cm at that time.

The ultrasonic motors provided with one of the friction materials (A4 to D4) pertaining to the present invention have a resonance frequency which fluctuates only a little (about 1.5 to 2.5 kHz) when the pressure is changed (in terms of braking torque in the range of 500 to 1500 gf·cm), and also have a braking torque which changes with time only a little. The friction materials wear very little and scratch the stator very little. Therefore, the ultrasonic motors maintained the stable drive performance regardless of the pressure change and exhibited the stable restarting performance over a long period of time. In the case of the ultrasonic motor provided with the friction material F4 (for comparison) made of engineering plastics, the resonance frequency greatly fluctuated (6.5 kHz) according as the pressure changed (in terms of braking torque from 500 gf·cm to 1000 gf·cm) and the braking torque greatly changed with time. The friction material wore the surface of the stator. The restarting of the motor became unstable after continuous running for a long time.

The motors provided with one of the friction materials (A4 to D4) pertaining to the present invention generated no noise. By contrast, the ultrasonic motor provided with the friction material (E4) made of fluorocarbon resin alone or the friction material (F4) made of engineering plastics became to generate noise after running for a long period of time.

The above-mentioned embodiments (a) to (g) indicate that the following functions and effects are produced when the ultrasonic motor is constructed such that a friction material made of at least fluorocarbon resin is present on the contact surface of at least either of the rotor or the stator.

(1) The fluorocarbon polymer has the ability to absorb vibration of specific frequency on account of its characteristic flexibility. Consequently, it completely prevents the ultrasonic motor from producing noise.

(2) Since the fluorocarbon polymer works as a solid lubricant on the contact surface and has an adhesive property, it provides smooth slipping between the stator and the rotor. Consequently, it permits the ultrasonic motor to produce a stable driving force.

(3) Owing to its comparatively high heat resistance, the fluorocarbon polymer does not suffer from seizure or melting even under the severe friction conditions produced by ultrasonic vibration. Consequently, it greatly reduces the wear of the contact surfaces of the ultrasonic motor and permits the ultrasonic motor to maintain its performance over a long period of time.

(4) Since the fluorocarbon resin has a lower hardness than the metallic material constituting the stator, it does not damage the contact surface of the stator and keeps the contact surface of the stator stable at all times. Therefore, the ultrasonic motor has a constant holding torque (which is a force to hold the rotor in position when the motor is at rest).

While specific embodiments of the invention have been illustrated and described herein, it is realized that other modifications and changes will occur to those skilled in the art. It is, therefore, to be understood that the appended claims are intended to cover all modifications and changes as fall within the true spirit and scope of the invention.

We claim:

1. In an ultrasonic motor wherein a moving body is contacted under a pressure on a vibrating body on which a piezoelectric body is disposed, and ultrasonic traveling-wave is produced on said piezoelectric body and said vibrating body by inputting high-frequency electric power of ultrasonic frequency to said piezoelectric body, and by this, said moving body is driven by means of wave-front of said traveling-wave through a friction means, the improvement wherein said moving body or the contact surface of said moving body consists essentially of a composite plastic resin material containing at least carbon fiber in an amount of more than 5 weight percent, fluorocarbon resin powder in an amount of more than 5 weight percent, and a matrix resin.

2. In an ultrasonic motor wherein a moving body is contacted under a pressure on a vibrating body on which a piezoelectric body is disposed, and ultrasonic traveling-wave is produced on said piezoelectric body and said vibrating body by inputting high-frequency electric power of ultrasonic frequency to said piezoelectric body, and by this, said moving body is driven by means of wave-front of said traveling-wave through a friction means the improvement wherein said moving body or the contact surface of said moving body is constituted of a composite plastic resin material containing at least an organic fiber in an amount of more than 5 weight percent, and a matrix resin.

3. An ultrasonic motor as claimed in claim 2 wherein said organic fiber is constituted of more than one organic fibers selected from the group consisting of aromatic polyamide and phenol or the organic polymer whisker groups.

4. In an ultrasonic motor wherein a moving body is contacted under a pressure on a vibrating body on which a piezoelectric body is disposed, an ultrasonic traveling-wave is produced on said piezoelectric body and said vibrating body by inputting high-frequency electric power of ultrasonic frequency to said piezoelectric body, and by this, the said moving body is driven by means of wave-front of said traveling-wave through a friction means, said moving body or the contact surface of said moving body is constituted of a fluorocarbon resin material containing at least carbon fiber or carbon powder.

5. An ultrasonic motor, as claimed in claim 4, wherein said organic fiber is in a form of woven textile.

6. An ultrasonic motor, as claimed in claim 4, wherein said organic fiber is in a form of felt.

* * * * *